US012558794B2

(12) United States Patent
Fras et al.

(10) Patent No.: US 12,558,794 B2
(45) Date of Patent: Feb. 24, 2026

(54) TACTILE SENSOR

(71) Applicant: Ocado Innovation Limited, Hatfield (GB)

(72) Inventors: Jan Fras, Hatfield (GB); Panagiotis Sotiropoulos, Hatfield (GB); Hussein Mnyusiwalla, Hatfield (GB); Enrique Del Sol Acero, Hatfield (GB); Pavlos Triantafyllou, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 83 days.

(21) Appl. No.: 18/553,293

(22) PCT Filed: Mar. 31, 2022

(86) PCT No.: PCT/EP2022/058679
§ 371 (c)(1),
(2) Date: Sep. 29, 2023

(87) PCT Pub. No.: WO2022/207853
PCT Pub. Date: Oct. 6, 2022

(65) Prior Publication Data
US 2024/0173868 A1     May 30, 2024

(30) Foreign Application Priority Data
Mar. 31, 2021   (GB) ..................................... 2104596

(51) Int. Cl.
*B25J 9/16*          (2006.01)
*B25J 9/14*          (2006.01)
(Continued)

(52) U.S. Cl.
CPC ............. *B25J 13/082* (2013.01); *B25J 9/142* (2013.01); *B25J 13/084* (2013.01);
(Continued)

(58) Field of Classification Search
CPC ........ B25J 13/082; B25J 9/142; B25J 13/084; B25J 15/0023; B25J 15/08; B25J 19/023; B25J 13/085; G01L 1/04
See application file for complete search history.

(56) References Cited

U.S. PATENT DOCUMENTS 5,364,146 A     11/1994  Brandorff et al.
5,459,329 A  *  10/1995  Sinclair .................. G09B 25/06
                                             250/341.8
(Continued)

FOREIGN PATENT DOCUMENTS

CN        107175677 B      7/2020
DE     102012203005 A1     8/2013
(Continued)

OTHER PUBLICATIONS

Office Action (Examination Report No. 1) issued on Jul. 2, 2024, by the Australian Patent Office in corresponding Australian Patent Application No. 2022248739. (4 pages).
(Continued)

*Primary Examiner* — Masud Ahmed
(74) *Attorney, Agent, or Firm* — Gregory Matt McCloskey

(57) ABSTRACT

This disclosure relates to a finger assembly for a manipulating apparatus including a rigid body and a deformable membrane received within an aperture. The deformable membrane includes a gripping surface arranged to grip an object being manipulated and visual markers. The finger assembly includes a reflective surface received within the rigid body opposite the deformable membrane to reflect an image of the visual markers, and an optical sensor arranged to view the visual markers and the reflected image of the visual markers, providing a stereoscopic view of the visual markers.

16 Claims, 9 Drawing Sheets

(51) Int. Cl.

| | | |
|---|---|---|
| *B25J 13/08* | (2006.01) | |
| *B25J 15/00* | (2006.01) | |
| *B25J 15/08* | (2006.01) | |
| *B25J 19/02* | (2006.01) | |

(52) U.S. Cl.
CPC ........... *B25J 15/0023* (2013.01); *B25J 15/08* (2013.01); *B25J 19/023* (2013.01)

(56) References Cited

U.S. PATENT DOCUMENTS

| | | | | |
|---|---|---|---|---|
| 6,386,609 | B1 * | 5/2002 | Govzman | ............ B25J 15/0253 294/207 |
| RE45,578 | E * | 6/2015 | Adelson | ................ G06F 3/0425 |
| 2003/0178556 | A1 | 9/2003 | Tachi et al. | |
| 2009/0315989 | A1 | 12/2009 | Adelson | |
| 2011/0276082 | A1 * | 11/2011 | Fehring | ................ A61H 1/0285 606/204 |
| 2013/0140839 | A1 * | 6/2013 | Quinn | .................... B66C 1/447 294/207 |
| 2014/0326882 | A1 | 11/2014 | Tar et al. | |
| 2016/0279805 | A1 | 9/2016 | Murota et al. | |
| 2018/0257241 | A1 * | 9/2018 | Claretti | ................ B25J 15/0028 |
| 2019/0072443 | A1 | 3/2019 | Reich et al. | |
| 2020/0139543 | A1 | 5/2020 | Saito | |
| 2021/0107100 | A1 | 4/2021 | Okamoto et al. | |
| 2022/0245750 | A1 | 8/2022 | Yamaguchi | |
| 2024/0181655 | A1 | 6/2024 | Fras et al. | |
| 2024/0208076 | A1 | 6/2024 | Fras et al. | |

FOREIGN PATENT DOCUMENTS

| | | | |
|---|---|---|---|
| JP | S60120229 | A | 6/1985 |
| JP | 2004050377 | A | 2/2004 |
| JP | 2010110846 | A | 5/2010 |
| JP | 2010221358 | A | 10/2010 |
| JP | 2011247711 | A | 12/2011 |
| JP | 2015112661 | A | 6/2015 |
| JP | 2018021888 | A | 2/2018 |
| JP | 2019217203 | A | 12/2019 |
| JP | 2024517068 | A | 4/2024 |
| WO | 0218893 | A1 | 3/2002 |
| WO | 2020165648 | A1 | 8/2020 |
| WO | 2021001992 | A1 | 1/2021 |
| WO | 2022207853 | A1 | 10/2022 |

OTHER PUBLICATIONS

Office Action (Examination Report No. 1) issued on Jul. 3, 2024, by the Australian Patent Office in corresponding Australian Patent Application No. 2022248740. (4 pages).

Office Action (Examination Report No. 1) issued on Jun. 20, 2024, by the Australian Patent Office in corresponding Australian Patent Application No. 2022247008. (3 pages).

International Search Report (PCT/ISA/210) and Written Opinion (PCT/ISA/237) mailed on Jul. 20, 2022, by the European Patent Office as the International Searching Authority for International Application No. PCT/EP2022/058665. (9 pages).

International Search Report (PCT/ISA/210) and Written Opinion (PCT/ISA/237) mailed on Jul. 21, 2022, by the European Patent Office as the International Searching Authority for International Application No. PCT/EP2022/058674. (9 pages).

International Search Report (PCT/ISA/210) and Written Opinion (PCT/ISA/237) mailed on Jul. 26, 2022, by the European Patent Office as the International Searching Authority for International Application No. PCT/EP2022/058679. (36 pages).

Patents Act 1977: Combined Search and Examination Report under Section 18(3) dated Mar. 28, 2023, issued by the United Kingdom Intellectual Property Office in corresponding Great Britain Application No. GB2104596.8. (3 pages).

Patents Act 1977: Combined Search and Examination Report under Sections 17 and 18 dated Sep. 24, 2021, issued by the United Kingdom Intellectual Property Office in corresponding Great Britain Application No. GB2104577.8. (4 pages).

Patents Act 1977: Examination Report under Section 18 dated Mar. 29, 2023, issued by the United Kingdom Intellectual Property Office in corresponding Great Britain Application No. GB2104612.3. (3 pages).

Patents Act 1977: Search Report under Section 17 dated Sep. 23, 2021, issued by the United Kingdom Intellectual Property Office in corresponding Great Britain Application No. GB2104596.8. (4 pages).

Patents Act 1977: Search Report under Section 17 dated Sep. 24, 2021, issued by the United Kingdom Intellectual Property Office in corresponding Great Britain Application No. GB2104577.8. (2 pages).

Patents Act 1977: Search Report under Section 17 dated Sep. 24, 2021, issued by the United Kingdom Intellectual Property Office in corresponding Great Britain Application No. GB2104612.3. (4 pages).

Spiers et al., "Variable-Friction End effector Surfaces to Enable Within-Hand Manipulation via Gripping and Sliding", 2018, IEEE Robotics and Automation Letters, pp. 4116-4123, vol. 3, No. 4.

First Office Action issued on Oct. 1, 2024, by the Japanese Patent Office in corresponding Japanese Patent Application No. 2023-560115, and an English Translation of the Office Action. (11 pages).

First Office Action issued on Oct. 1, 2024, by the Japanese Patent Office in corresponding Japanese Patent Application No. 2023-560118, and an English Translation of the Office Action. (11 pages).

First Office Action issued on Oct. 29, 2024, by the Japanese Patent Office in corresponding Japanese Patent Application No. 2023-560119, and an English Translation of the Office Action. (11 pages).

Office Action (Examination Report No. 2) issued on Oct. 8, 2024, by the Australian Patent Office in corresponding Australian Patent Application No. 2022248740. (4 pages).

Office Action issued on Dec. 19, 2024, by the Canadian Patent Office in corresponding Canadian Patent Application No. 3,214,123. (4 pages).

Office Action issued on Oct. 14, 2025 by the Korean Patent Office in corresponding Korean Application No. 10-2023-7037536 (9 pages) corresponding to Applicant's U.S. Appl. No. 18/553,293.

* cited by examiner

72

70

TACTILE SENSOR

The present disclosure relates to a tactile sensor for a finger assembly of a manipulating apparatus. More specifically, it relates to a camera-based tactile sensor. Aspects of the invention relate to the finger assembly itself, the manipulating apparatus and a controller for the manipulating apparatus.

BACKGROUND

Automated picking or sorting systems require manipulating apparatuses which are able to select an item from a first receptacle, such as a tote or another type of storage unit, grip the item, and then move the item into a second receptacle, such as a bag. When manipulating items, it is beneficial if the finger assemblies gripping the item are reasonably small, so that they are able to access differently sized receptacles without being impeded by the receptacles. It is particularly beneficial to minimise their thickness relative to their width, so that they can access small spaces, whilst maintaining a reasonably large gripping surface area. Minimising the size of the finger assemblies may also positively influence their manoeuvrability. However, the desire for smaller finger assemblies is counter to the requirement for a more sophisticated tactile response, which requires greater complexity within the finger assemblies themselves, so that they are able to manipulate a wider range of objects.

It is against this background that the invention has been devised.

SUMMARY

The invention according provides, in a first aspect, a finger assembly for a manipulating apparatus, the finger assembly comprising a rigid body comprising an aperture; a deformable membrane received within the aperture, wherein an exterior surface of the deformable membrane comprises a gripping surface arranged to grip an object being manipulated and an interior surface of the deformable element comprises a visual markers; a reflective surface received within the rigid body opposed the deformable membrane so as to reflect an image of the visual markers; and, an optical sensor arranged to view the visual markers on the interior surface of the deformable membrane and a reflected image of the visual markers so as to provide a stereoscopic view of the visual markers. This greatly influences the form factor of the finger assembly as the absence of a second optical sensor for providing the stereoscopic view provides an opportunity to, for example, minimise the thickness of the finger assembly and reduce the number of electrical components housed within the finger assembly when compared with finger assemblies comprising two or more optical sensors. These are particularly desirable characteristics since they reduce the volume of the finger assembly, increasing its accessibility, well as reducing capital and operating expenses, whilst maintaining the surface area of its gripping surface.

Preferably, the rigid body comprises a housing and a frame fastened to the housing, wherein the frame comprises the aperture and wherein the deformable membrane is clamped between the housing and frame.

Preferably, the surface area of the frame used to clamp the deformable membrane is greater than the surface area of housing used to clamp the deformable element.

Preferably, the surface area of the housing used to clamp the deformable element is formed on a ridge circumscribing an inner peripheral edge of the housing.

Preferably, the optical sensor is positioned such that its optical axis and a plane defined by the intersection between the housing and frame form an acute angle.

Preferably, the optical sensor is positioned such that its optical axis and the reflective surface do not intersect.

Preferably, the reflective surface and the deformable membrane are convergently arranged in a direction from the optical sensor.

Preferably, the reflective surface and the deformable membrane meet at an end of the rigid body opposite the optical sensor.

Preferably, the reflective surface is positioned such that it forms an acute angle with a plane defined by the intersection between the housing and frame.

Preferably, the visual markers comprise alternating markers of contrasting colours. Alternatively, the visual markers form a grid comprising a plurality of rows of markers, wherein the colour of the markers within any one row is the same and wherein the colour of the markers in at least one of the rows differs from the colour of the markers in the other rows. Preferably, the colour of the markers in each row differs from the colour of the markers in the other rows.

Preferably, the finger assembly further comprises a light source for illuminating the interior of the finger assembly. Preferably, the light source is adjacent to the reflective surface. The light source is especially preferable if the housing and frame are opaque to reduce ambient light influence, ensuring sufficient and controllable illumination of the interior of the finger assembly so that the optical sensor can view the visual markers on the interior surface of the deformable membrane and the reflect image of the visual markers from the reflective surface. Positioning the light source adjacent to the reflective surface enhancing the illumination of the interior of the finger assembly.

In a second aspect, the invention provides a controller for a manipulating apparatus, the manipulating apparatus comprising a finger assembly according to the first aspect; and, an inflating means operatively coupled to the finger assembly, the inflating means being configured to receive a control signal and pressurise the interior of the finger assembly in dependence on the control signal, the controller comprising an input configured to receive a first visual data input signal from the optical sensor, the first visual data input signal being indicative of an image of the visual markers on the interior surface of the deformable membrane, and a second visual data input signal from the optical sensor, the second visual data input signal being indicative of a reflected image of the visual markers on the interior surface of the deformable membrane; and, a processor configured to determine a deformation of the deformable membrane in dependence on the first and second visual data input signals; determine a force acting on the deformable membrane based on the deformation; and, generate a control signal for the inflating means to increase the pressure inside the finger assembly if the force acting on the deformable membrane is less than a target force; or, generate a control signal for the inflating means to decrease the pressure inside the finger assembly if the force acting on the deformable element is greater than the target force.

Preferably, the controller is further configured to initialise a first plurality of image points, wherein each image point of the first plurality of image points is indicative of a location of a respective marker of the visual markers within the first visual data input signal; initialise a second plurality of image points, wherein each image point of the second plurality of image points is indicative of a location of a respective marker of the visual markers with the second visual data input signal; determine a disparity map in dependence on the first and second plurality of image points; and, determine a shape of the deformable membrane in dependence on the disparity map.

In a third aspect, the invention provides a manipulating apparatus comprising a finger assembly according to the first aspect; an inflating means operatively coupled to the finger assembly, the inflating means being configured to receive a control signal and pressurise the interior of the finger assembly in dependence on the control signal; and, a controller according to the second aspect.

BRIEF DESCRIPTION OF THE DRAWINGS

These and other aspects of the invention will now be described, by way of example only, and with reference to the accompanying drawings, in which.

Figure 1:
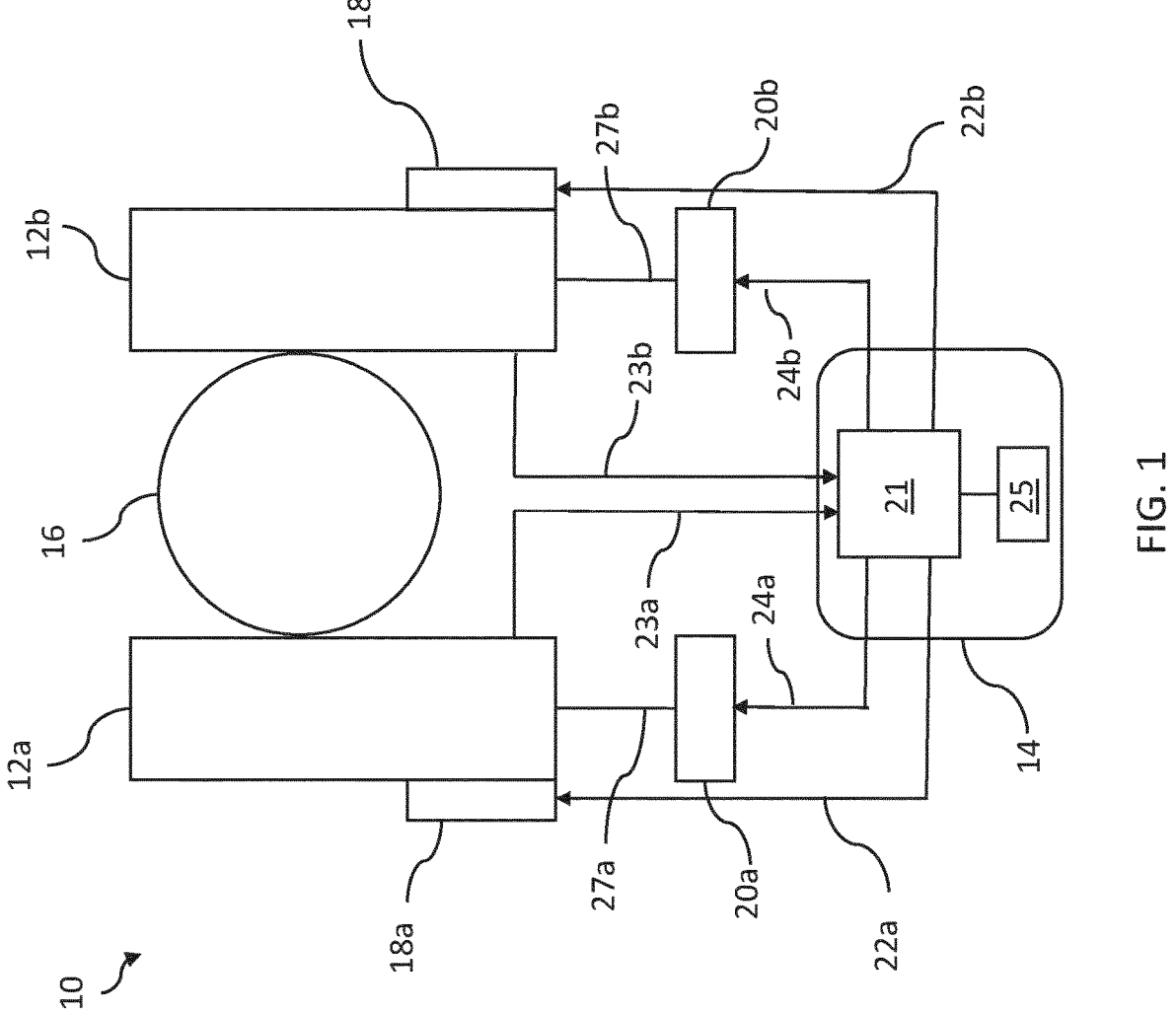
FIG. 1 is schematic depiction of a manipulating apparatus according to an embodiment of the invention.

In the drawings, like features are denoted by like reference signs where appropriate.

DETAILED DESCRIPTION

In the following description, some specific details are included to provide a thorough understanding of the disclosed examples. One skilled in the relevant art, however, will recognise that other examples may be practiced without one or more of these specific details, or with other components, materials, etc., and structural changes may be made without departing from the scope of the invention as defined in the appended claims. Moreover, references in the following description to any terms having an implied orientation are not intended to be limiting and refer only to the orientation of the features as shown in the accompanying drawings. In some instances, well-known features or systems, such as processors, sensors, storage devices, network interfaces, fasteners, electrical connectors, and the like are not shown or described in detail to avoid unnecessarily obscuring descriptions of the disclosed embodiment.

Unless the context requires otherwise, throughout the specification and the appended claims, the word "comprise" and variations thereof, such as, "comprises" and "comprising" are to be construed in an open, inclusive sense that is as "including, but not limited to." Reference throughout this specification to "one", "an", or "another" applied to "embodiment", "example", means that a particular referent feature, structure, or characteristic described in connection with the embodiment, example, or implementation is included in at least one embodiment, example, or implementation. Thus, the appearances of the phrase "in one embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the users forms "a", "an", and "the" include plural referents unless the content clearly dictates otherwise. It should also be noted that the term "or" is generally employed in its sense including "and/or" unless the content clearly dictates otherwise.

FIG. 1 shows a schematic depiction of a manipulating apparatus 10 according to an embodiment of the invention comprising a first finger assembly 12a opposing a second finger assembly 12b, and a controller 14. Each one of the first and second finger assemblies 12a, 12b includes a deformable membrane (not shown), an exterior surface of which comprises a gripping surface arranged to grip an object 16 being manipulated, together with an optical sensor housed inside the finger assembly 12a, 12b for viewing deformations of the deformable membrane while the object 16 is being manipulating. The manipulating apparatus 10 further comprises a first actuator 18a and a first pressure regulating means 20a, both of which are associated with the first finger assembly 12a, and a second actuator 18b and a second pressure regulating means 20b associated with the second finger assembly 12b. The first and second pressure regulating means 20a, 20b are connected to their associated finger assembly 12a, 12b by respective pressure lines 27a, 27b. The controller 14 comprises an electronic processor 21 having one or more electrical inputs for receiving first and second visual data input signals 23a, 23b from the optical sensors, and one or more electrical outputs for outputting one or more control signals 22a, 22b, 24a, 24b to the first and second actuators and pressure regulating means 18a, 18b, 20a, 20b in dependence on the visual data input signals 23a, 23b. For example, the controller 14 is configured to output a first actuation control signal 22a for moving the first finger assembly 12a based on the first visual data input signal 23a. The first actuator 18a is configured to receive the first actuation control signal 22a and move the first finger assembly 12a relative to the second finger assembly 12b in dependence on the first actuation control signal 22a. Similarly, the controller 14 may also output a second actuation control signal 22b for moving the second finger assembly 12b based on the second visual data input signal 23b. The second actuator 18b is configured to receive the second actuation control signal 22b and move the second finger assembly 12b relative to the first finger assembly 12a in dependence on the second actuation control signal 22b. These movements may be about multiple axes of movement and include rotation of one of the first or second finger assembly 12a, 12b relative to the other of the first or second finger assembly 12a, 12b. Such movement may allow an object 16 to be gripped between the first and second finger assemblies 12a, 12b. The first and second finger assembly 12a, 12b may also be movable together such that an object 16 gripped between the first and second finger assemblies 12a, 12b can be moved from a first location to a second location. The controller 14 is further configured to output inflation control signals 24a, 24b, in dependence on respective visual data input signals 23a, 23b, to control the first or second pressure regulating means 20a, 20b in order alter the pressure in the interior of the first or second finger assemblies 12a, 12b so as to change the compliance of their respective deformable elements. Specifically, the controller 14 is arranged to output a first inflation control signal 24a based on the first visual data input signal 23a, and the first pressure regulating means 20a is configured to receive the first inflation control signal 24a and pressurise the first finger assembly 12a in dependence on the first inflation control signal 24a. Similarly, the controller 14 is arranged to output a second inflation control signal 24b based on the second visual data input signal 23b, and the second pressure regulating means 20b is configured to receive the second inflation control signal 24b and pressurise the second finger assembly 12b in dependence on the second inflation control signal 24b in order to alter the compliance of its deformable membrane. In order to generate the control signals 22a, 22b, 24a, 24b, the controller 14 further comprises a memory device 25 electrically coupled to the electronic processor 21 and having instructions stored therein. The electronic processor 21 is configured to access the memory device 25 and execute the instructions stored thereon so as to carry out the process 100 shown in FIG. 2.

Figure 2:
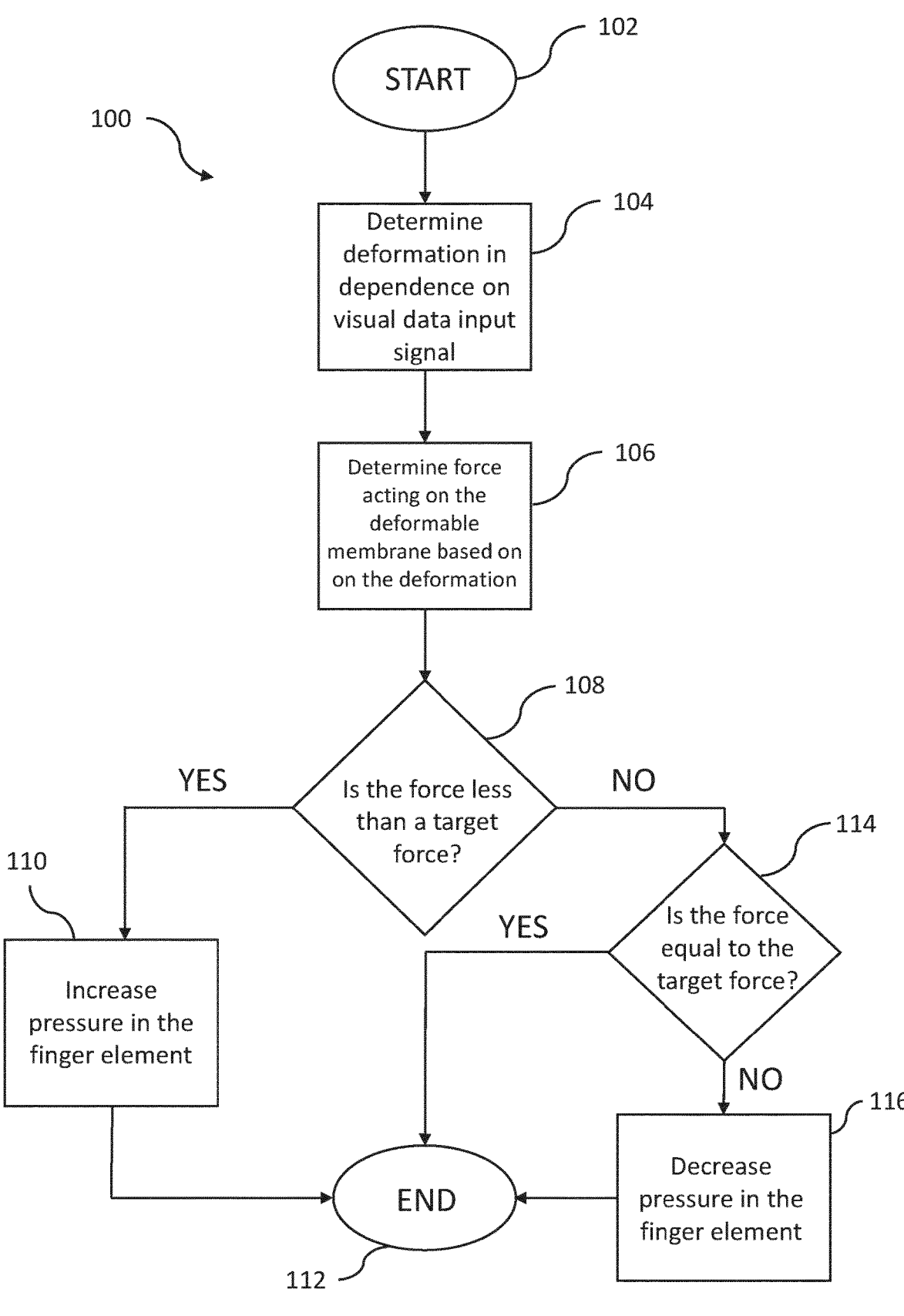
FIG. 2 is a flow chart of a process carried out by the controller of FIG. 1.

With reference to FIG. 2, the process 100 starts at step 102 and progresses to step 104 where a deformation of the deformable membrane of a finger assembly 12' during the manipulation of the object 16 is determined in dependence on the visual data input signals 23'. The process 100 then progresses to step 106, where a force acting on the deformable membrane is determined based on the deformation determined at step 104, and then onto step 108. If it is determined, at step 108, that the force acting on the deformable membrane is less than a target force, the process proceeds to step 110 where an inflation control signal 24' is generated for a pressure regulating means 20' to increase the pressure inside the finger assembly 12' before the process finishes at step 112. If it is determined, at step 108, that the force acting on the deformable membrane not less than the target force, the process 100 proceeds to step 114 where it is determined if the force is equal to or greater than the target force. If it is determined that the force equals the target force, the process 100 progresses to step 112 where it finishes. On the other hand, if it is determined at step 114 that the force is not equal to the target force, but is greater than the target force, the process 100 moves to step 116 where an inflation control signal 24' is generated for the pressure regulating means 20' to decrease the pressure inside the finger assembly 12', before the process 100 goes on to finish at step 112. The target force can be selected at any time before step 106 and may be predetermined based on a characteristic of the object 16 being manipulated or a combination of its characteristics, such as its shape, weight, stiffness, fragility, etc. In this way, the force exerted by the deformable membrane on an object 16 being manipulated can be sensed, and increased or decreased according to a characteristic of the object 16.

Figure 3:
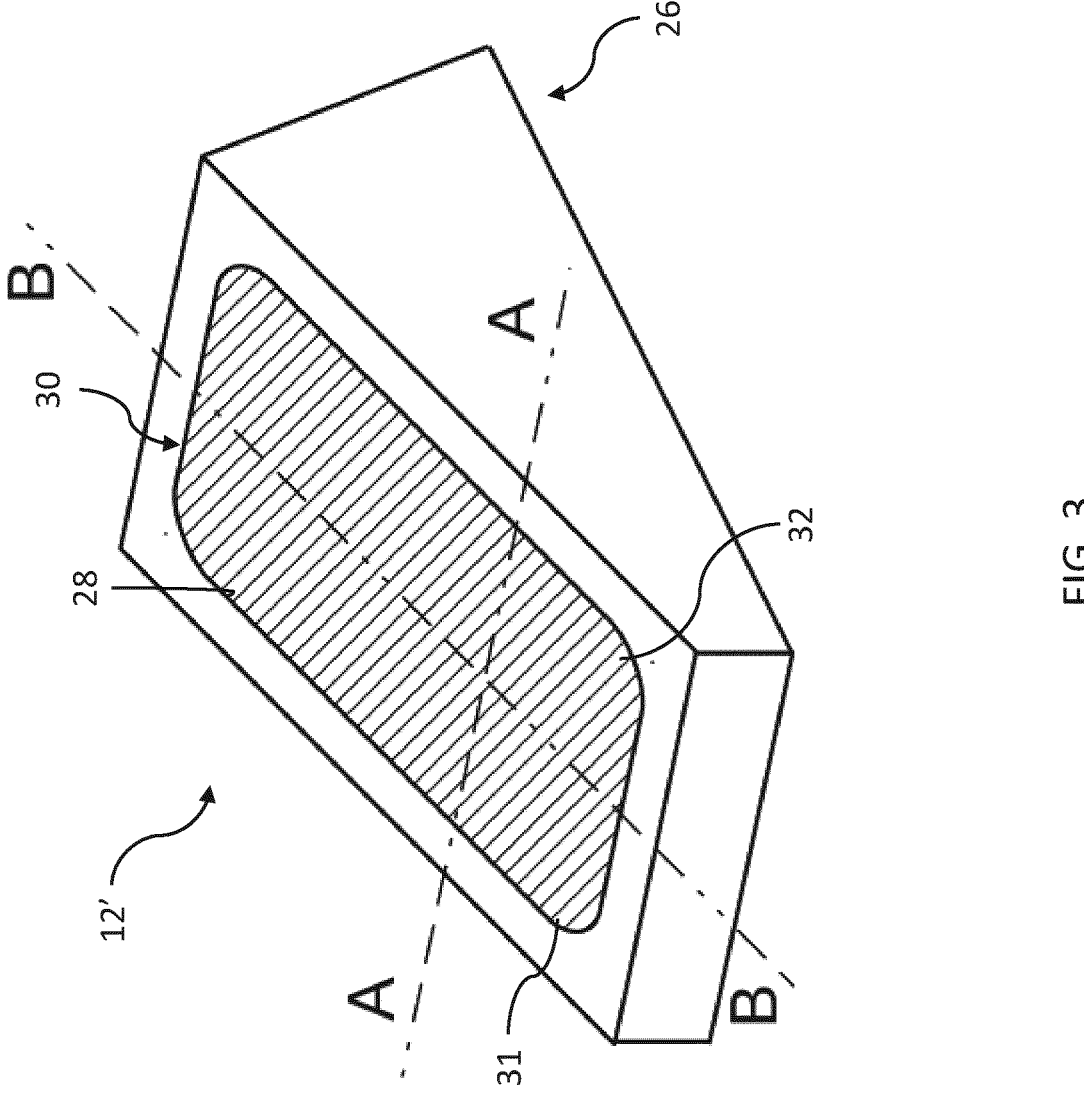
FIG. 3 is a perspective view of a finger assembly for use with the manipulating apparatus of FIG. 1 according to an embodiment of the invention.

FIG. 3 shows a finger assembly 12' according to an embodiment of the invention, which is suitable for use in the manipulating apparatus 10. The finger assembly 12' comprises a rigid body, generally designated by 26, comprising an aperture 28, within which is received a deformable membrane 30. The deformable membrane 30 may be formed from two layers of a flexible silicon material securely connected together, for example by the use of an adhesive. An exterior surface 31 of the deformable membrane 30 comprises a gripping surface 32 arranged to grip an object 16 being manipulated, whereas an interior surface 33 of the deformable membrane 30 comprises visual markers.

Figure 4:
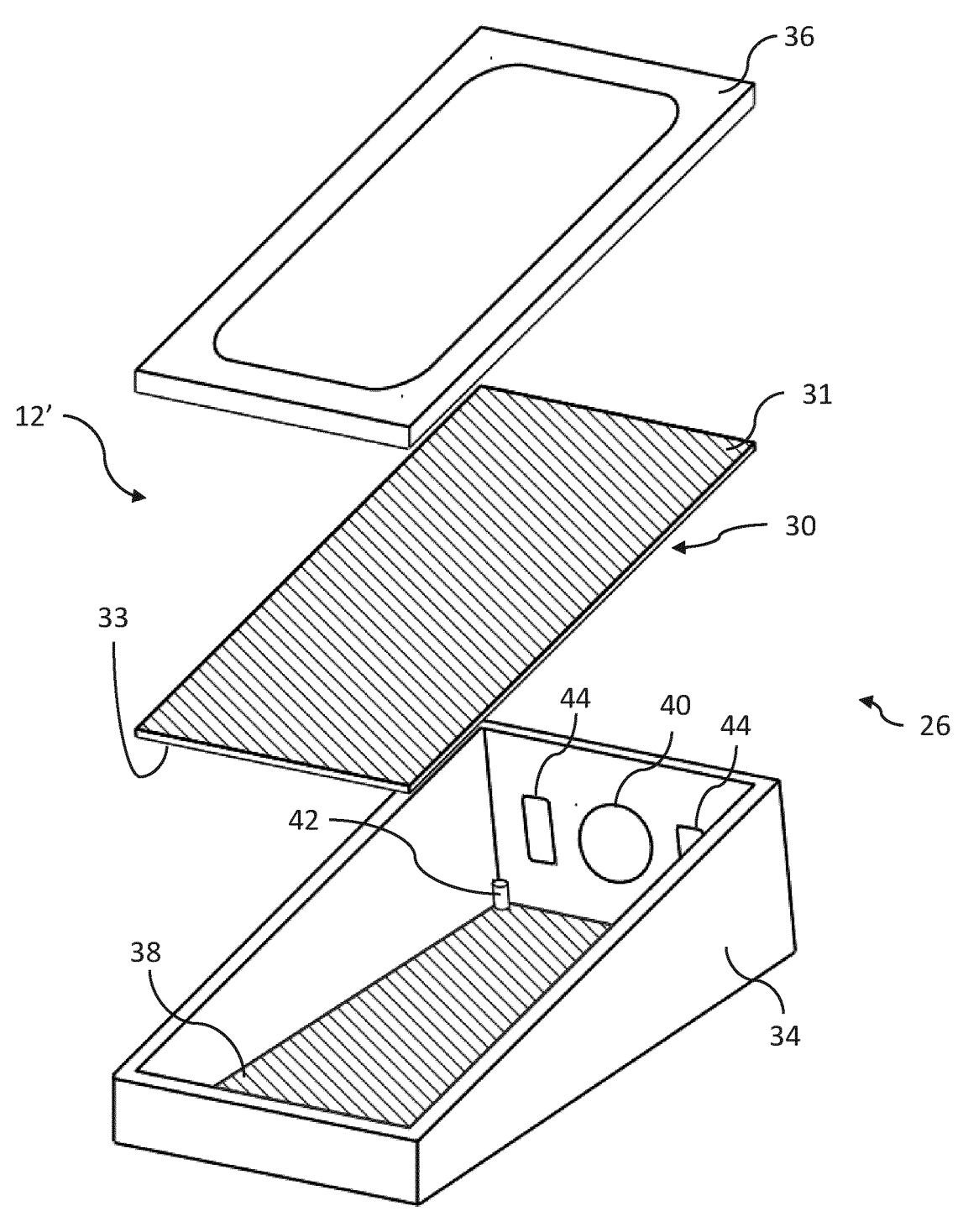
FIG. 4 is an exploded view of the finger assembly of FIG. 3.

Turning to FIG. 4, the rigid body 26 comprises a housing 34 and a frame 36 configured to be secured to the housing 34. The frame 36 may be glued to the housing 34 or, alternatively, it might be screwed or clamped to the housing 34 using a suitable mechanism allowing straightforward access to the interior of the finger assembly 12' should the deformable membrane 30 or any other component housed within the finger assembly 12' need replacing. The deformable membrane 30 is positioned between the housing 34 and frame 36 so as to be clamped therebetween when the finger assembly 12' is assembled. The finger assembly 12' further comprises a reflective surface 38 and an optical sensor 40 having a single optical axis, such as a complementary metal oxide semiconductor (CMOS) or charged-coupled device (CCD) camera. The reflective surface 38 is positioned within the rigid body 26, on a side opposing the deformable membrane 30, so as to reflect an image of the visual markers on the interior surface 33 of the deformable membrane 30. A channel 42 is also provided in the finger assembly 12' to provide fluidic communication between the interior of the finger assembly 12' and its respective pressure regulating means 20' through its respective pressure line 27'. A light source 44, such as a light-emitting diode (LED), may be also provided to illuminate the interior of the finger assembly 12'. The use of the light source 44 is especially preferable so as to ensure sufficient and controllable illumination of the interior of the finger assembly 12' if the housing 34 and frame 36 are made opaque to reduce ambient light influence. In this embodiment, the light source 44 is positioned adjacent to the reflective surface 38 such that light directly from the light source 44 is reflected, enhancing the illumination of the interior of the finger assembly 12'.

Figure 5:
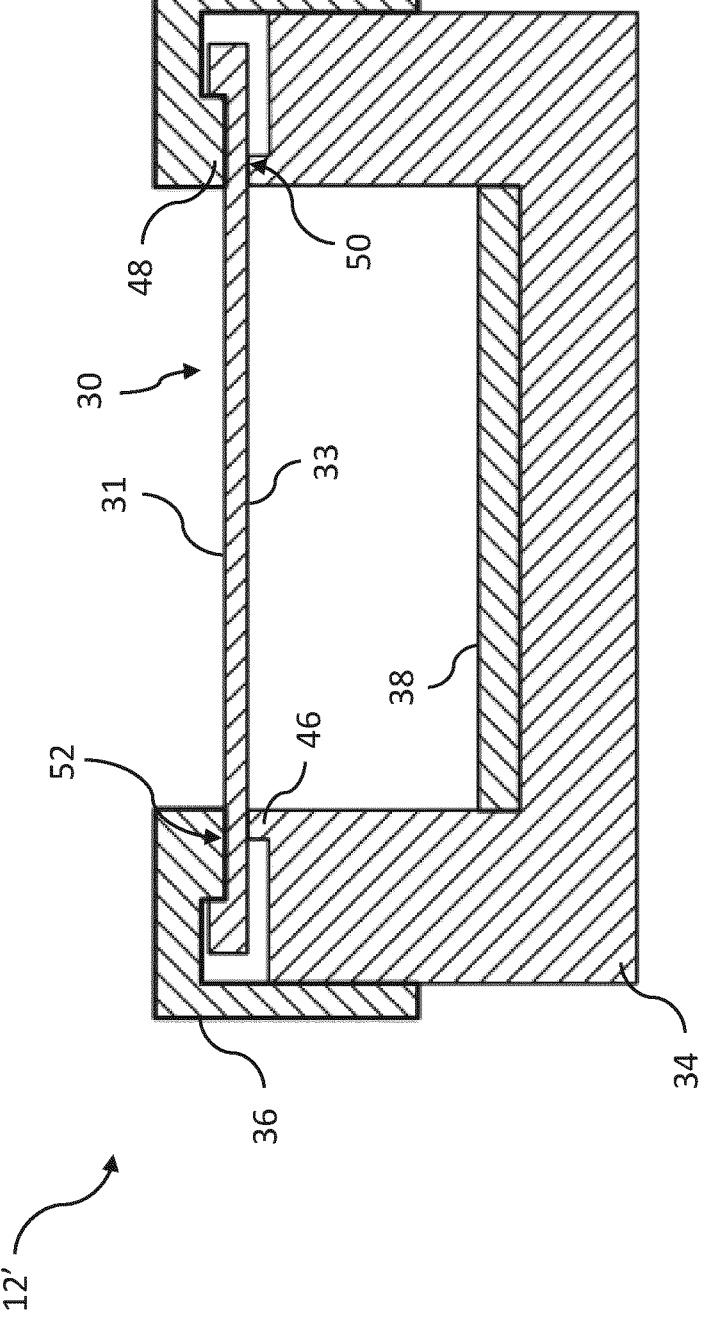
FIG. 5 is a cross-sectional schematic view of the finger assembly of FIG. 3 along section A-A.

FIG. 5 is a cross-sectional schematic view of the finger assembly 12' showing the deformable membrane 30 clamped between the housing 34 and frame 36. The housing 34 and frame 36 each comprise respective ridges 46, 48 that define opposing clamping surfaces 50, 52 for holding the deformable membrane 30 in position. The ridge 46 of the housing 34 circumscribes an inner peripheral edge 54 of the housing 34, and the ridge 48 of the frame 36 defines the aperture 28. The ridge 48 of the frame 36 is wider than the ridge 46 of the housing 34, accordingly the area of the clamping surface 52 of the frame 36 is greater than the area of the clamping surface 50 of the housing 34. For a given clamping force, therefore, the pressure applied to the interior surface 33 of the deformable membrane 30 by the clamping surface 50 of the housing 34 is comparatively greater than the pressure applied by the clamping surface 52 of the frame 36 to the exterior surface 31 of the deformable membrane 30. This is desirable to avoid leaks from within the interior of the finger assembly 12' when the interior of the finger assembly 12' is pressurised.

Figures 6A, 6B, 6C:
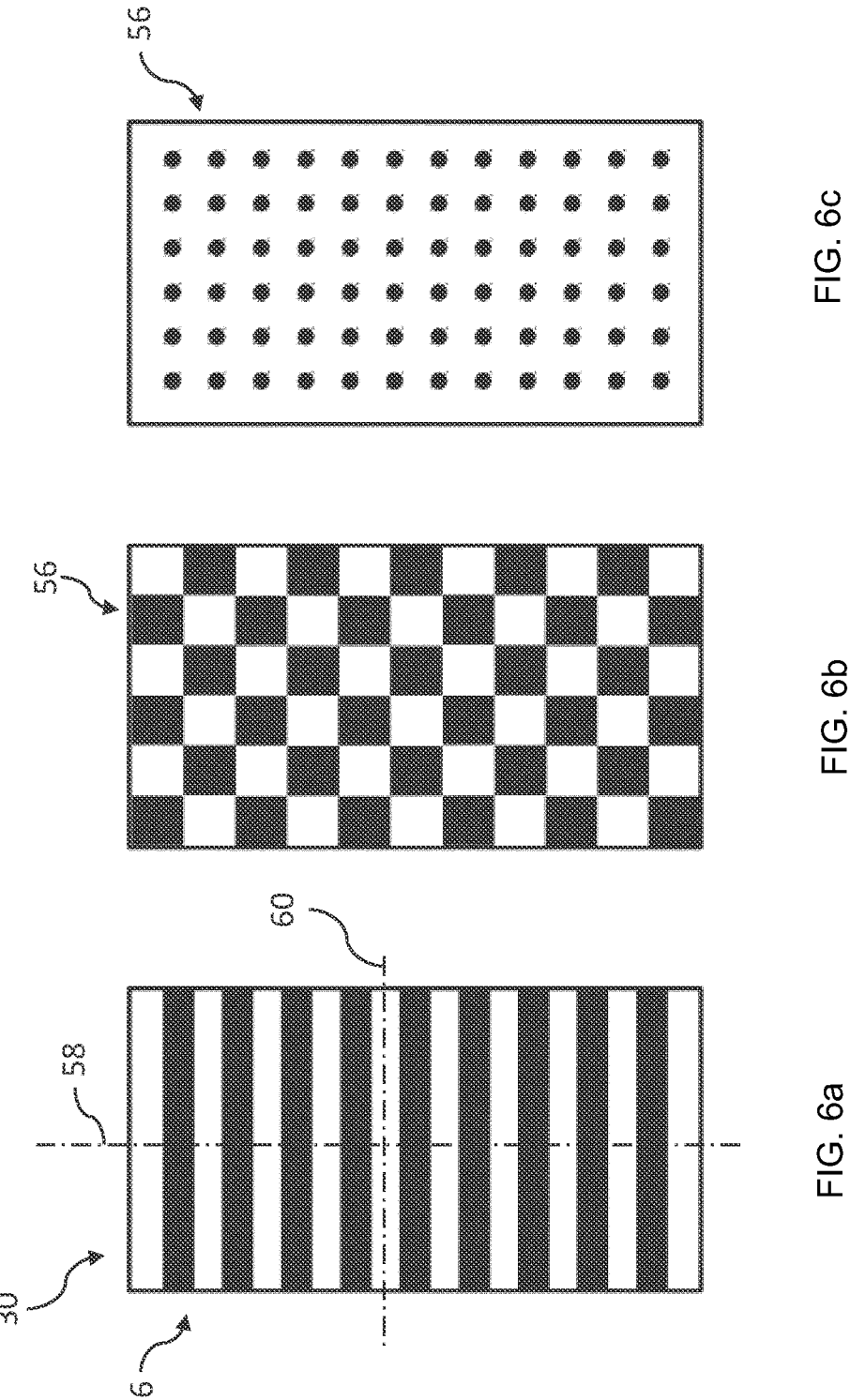
FIGS. 6a to 6c show three examples of visual markers on an interior surface of a deformable membrane of the finger assembly of FIG. 3.

As mentioned above, the interior surface 33 of the deformable membrane 30 comprises visual markers, and FIGS. 6a to 6c show three examples of the visual markers, generally designated by 56, all of which are suitable for use with the finger assembly 12'. The visual markers 56 of the first two examples, shown in FIGS. 6a and 6b, can be generalised in that they comprise alternating markers of contrasting colours. The deformable membrane 30 is generally elongate insofar that it comprises major and minor perpendicular axes 58, 60. The first example of the visual markers 56, shown in FIG. 6a, comprise a plurality of straight lines having contrasting colours. In this example, the straight lines extend across the interior surface 33 of the deformable membrane 30 in a direction of the minor axis 60, and alternate between contrasting colours in a direction of the major axis 58. The second example of the visual markers 56, shown in FIG. 6b, comprises a monochrome six-by-eleven grid or array of squares that are contrasting in the manner of a chess board. In the third example, shown in FIG. 6c, the visual markers 56 comprise a plurality of circular markers or dots arranged into a plurality of rows of markers extending in a direction of the minor axis 60. The circular markers forming each row are the same colour, but the colour of the markers in each row differs from the colour of the markers in the other rows. The use of differently coloured rows provides additional visual information for the optical sensor 40 on the sequence of the rows.

This may be particularly beneficial if one or more of the rows cannot be viewed by the optical sensor 40 due to a deformation of the deformable membrane 30. FIGS. 6a to 6c show just three examples of the visual markers 56, but it should be understood that the visual markers 56 may take a wide range of forms and may comprise, for example, one or more, or a combination of, diagonal lines, curved lines, intersecting lines, regular and/or irregular polygons, lines and/or 2- or 3-D shapes of different colours and/or shading, etc. It should be understood from this, therefore, that whilst there are advantages and benefits to choosing one type of visual markers 56 over another type, the specific nature of the visual markers 56 is not critical to the teaching of the invention.

Figure 7:
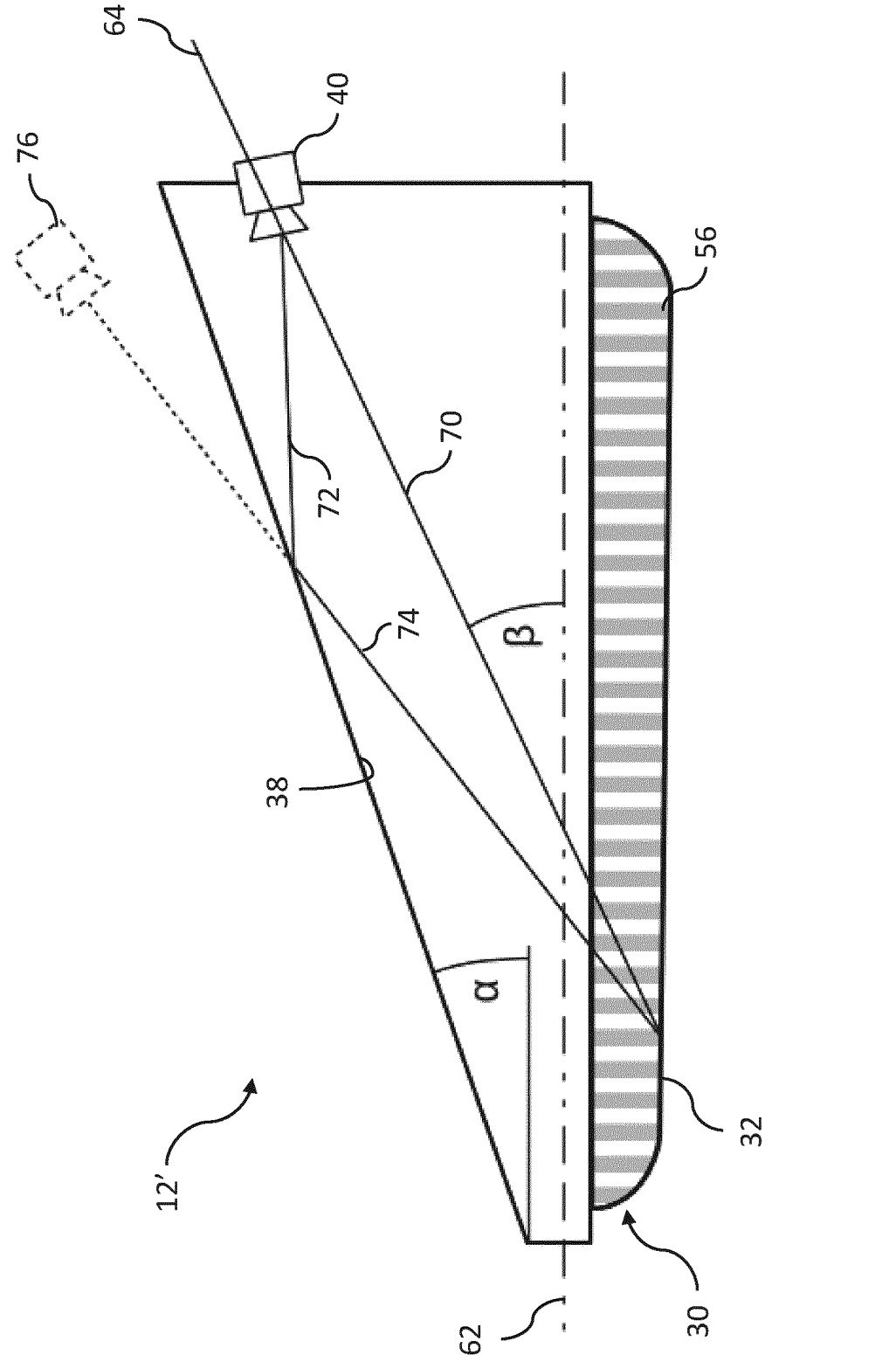
FIG. 7 is a cross-sectional schematic view of the finger assembly of FIG. 3 along section B-B.
Figure 8:
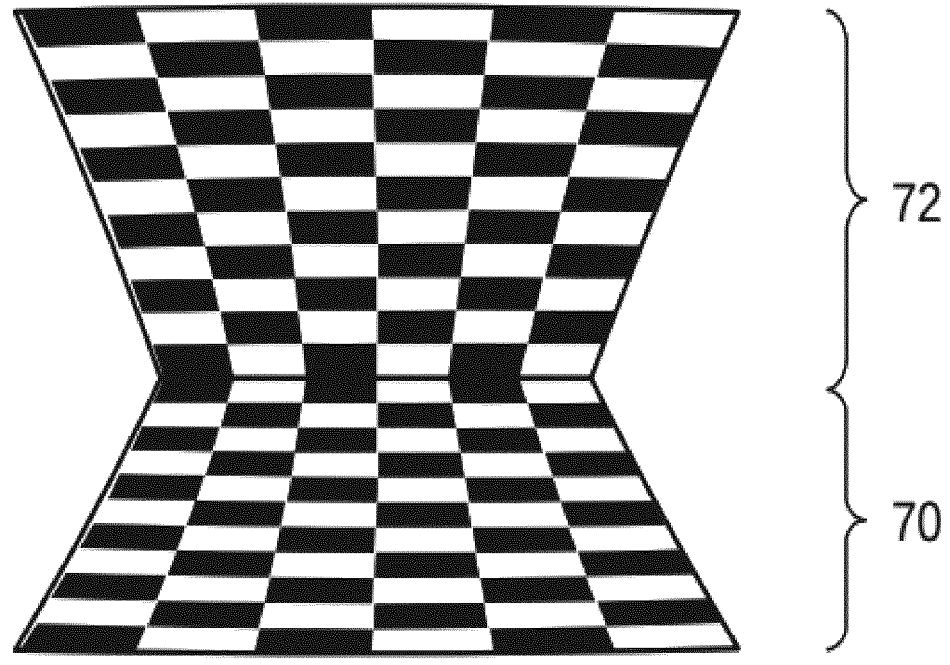
FIG. 8 is a schematic illustration of direct and reflected images viewed by an optical sensor within the finger assembly of FIG. 3; and, FIG. 9 is a flow chart of a process carried out by the controller of FIG. 1.

FIG. 7 is a cross-sectional schematic view of the finger assembly 12' showing the orientation of the optical sensor 40. The reflective surface 38 and deformable membrane 30 are convergently arranged in a direction extend from the optical sensor 40 such that the reflective surface 38 forms an acute angle α with a plane 62 defined by the intersection between the housing 34 and frame 36. Preferably, the reflective surface 38 and deformable membrane 30 meet at an end of the rigid body 26 opposite the optical sensor 40, minimising the thickness of the finger assembly 12' in that region. In this example, the optical sensor 40 is positioned such that an acute angle β is formed between its optical axis 64 and the plane 62. In general, the optical sensor 40 is arranged to view the visual markers 56, depicted here by a series of vertical lines, so that their locations within three dimensions can be determined. To this end, the optical sensor 40 is orientated, with respect to the reflective surface 38, so as to receive two images: i) a direct image 70 of the visual markers 56 along its optical axis 64; and, ii) a reflected image 72 from the reflective surface 38 of the visual markers 56 along a second optical axis 74 (see FIG. 8). The reflected image 72 provides an image that is equivalent to a direct image from a virtual optical sensor 76, which can be combined with the direct image 70 from the optical sensor 40 to provide a stereoscopic view of the visual markers 56 from which a deformation of the deformable membrane 30 can be determined without the need for a second optical sensor. That is, the reflective surface 38 provides a viewing perspective of the visual markers 56 that differs from the perspective of the optical sensor 40, but without the space that a second optical sensor would require in order to provide the desired viewing perspective. This greatly influences the form factor of the finger assembly 12' as the absence of a second optical sensor provides an opportunity to minimise the thickness of the rigid body 26, and reduce the number of electrical components when compared with finger assemblies comprising two or more optical sensors. These are particularly desirable characteristics since they reduce the volume of the finger assembly 12', increasing its accessibility to small spaces, well as reducing capital and operating expenses, whilst maintaining the size of its gripping surface 32.

Figure 9:
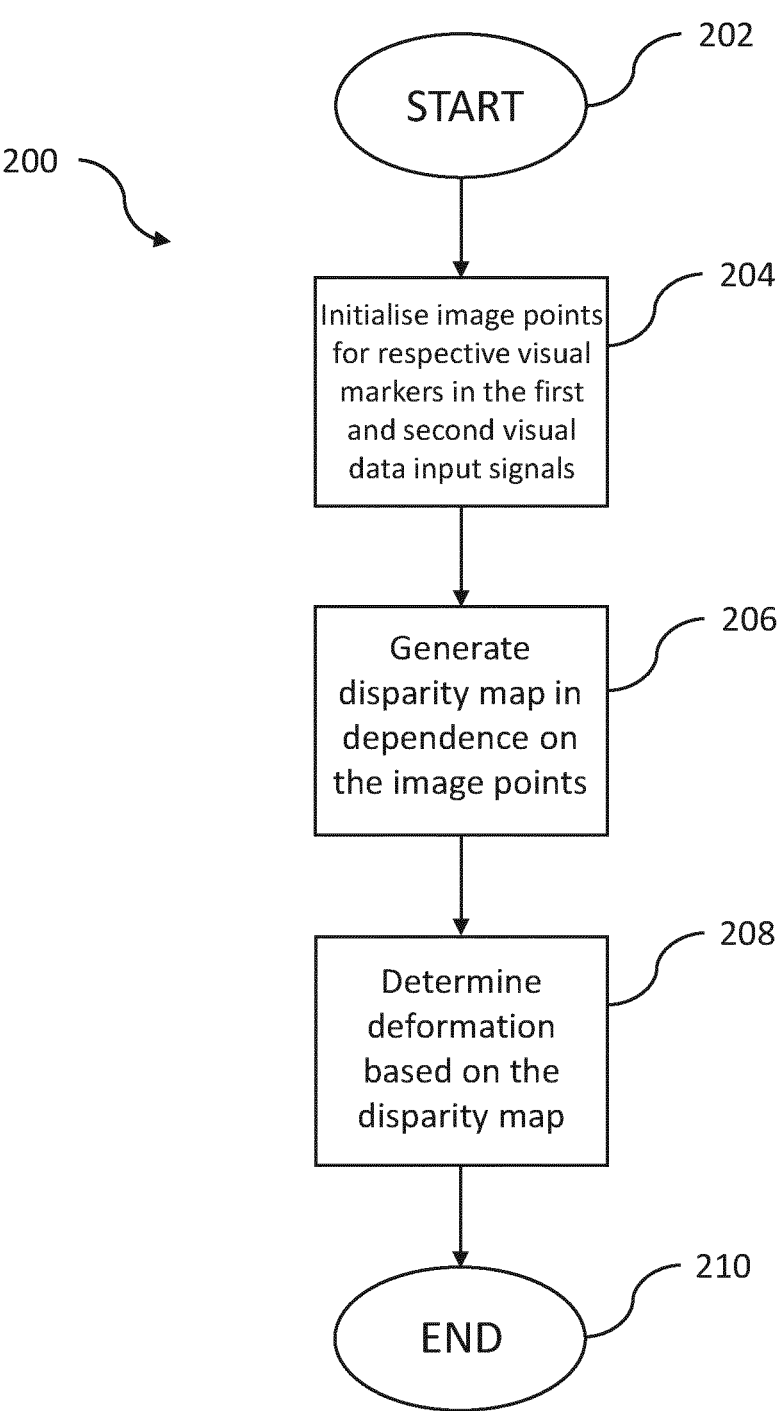

As mentioned above, the electrical inputs of the electronic processor 21 are configured to receive first and second visual data input signals 23' from the optical sensor 40, the first and second visual data input signals 23' being indicative of the direct and reflected images 70, 72 of the visual markers 56 respectively. The electronic processor 21 then accesses the memory device 25 and executes the instructions stored thereon so as to determine a deformation of the deformable membrane 30 in dependence on the first and second visual data input signals 23' according to step 104 of the process 100 shown in FIG. 2. In order to carry this step, the electronic processor 21 performs the process 200 shown in FIG. 9. The process 200 starts at step 202 and progresses to step 204 where first and second plurality of image points are initialised, wherein each image point of the first and second plurality of image points is indicative of a location of a respective mark of the visual markers 56 within the first and second visual data input signals 23' respectively. From here, the process 200 progresses to step 206 where a disparity map is generated in dependence on the first and second plurality of image points. The deformation of the deformable membrane 30 is then determined based on the disparity map at step 208 before the process 200 finishes at step 210.

The foregoing description has been presented for the purpose of illustration only and is not intended to be exhaustive or to limit the invention to the precise embodiments disclosed. It will be appreciated that modifications and variations can be made to the described embodiments without departing from the scope of the invention as defined in the appended claims.

The invention claimed is:

1. A controller for a manipulating apparatus, the manipulating apparatus comprising:
 a finger assembly including:
  a rigid body including an aperture;
  a deformable membrane received within the aperture, wherein an exterior surface of the deformable membrane includes a gripping surface arranged to grip an object being manipulated and an interior surface of the deformable element includes visual markers;
  a reflective surface received within the rigid body opposite the deformable membrane so as to reflect an image of the visual markers; and
  an optical sensor arranged to view the visual markers on the interior surface of the deformable membrane and a reflected image of the visual markers so as to provide a stereoscopic view of the visual markers;
 an inflating means operatively coupled to the finger assembly, the inflating means being configured to receive a control signal and pressurize an interior of the finger assembly in dependence on the control signal;
 an input configured to receive a first visual data input signal from the optical sensor, the first visual data input signal being indicative of an image of the visual markers on an interior surface of the deformable membrane, and a second visual data input signal from the optical sensor, the second visual data input signal being indicative of a reflected image of the visual markers on the interior surface of the deformable membrane; and
 a processor configured to:
  determine a deformation of the deformable membrane in dependence on the first and second visual data input signals;
  determine a force acting on the deformable membrane based on the deformation; and generate a control signal for the inflating means to increase pressure inside the finger assembly when the force acting on the deformable membrane is less than a target force; or generate a control signal for the inflating means to decrease the pressure inside the finger assembly when the force acting on the deformable element is greater than the target force.

2. The controller according to claim 1, wherein the rigid body comprises:

a housing; and a frame fastened to the housing, wherein the frame includes the aperture and wherein the deformable membrane is clamped between the housing and frame.

3. The controller according to claim 2, wherein a surface area of the frame used to clamp the deformable membrane is greater than a surface area of housing used to clamp the deformable element.

4. The controller according to claim 3, wherein the surface area of the housing used to clamp the deformable element is formed on a ridge circumscribing an inner peripheral edge of the housing.

5. The controller according to claim 4, wherein the optical sensor is positioned such that its optical axis and a plane defined by an intersection between the housing and frame form an acute angle.

6. The controller according to claim 1, wherein the optical sensor is positioned such that its optical axis and the reflective surface do not intersect.

7. The controller according to claim 1, wherein the reflective surface and the deformable membrane are convergently arranged in a direction from the optical sensor.

8. The controller according to claim 7, wherein the reflective surface and the deformable membrane meet at an end of the rigid body opposite the optical sensor.

9. The controller according to claim 2, wherein the reflective surface is positioned such that it forms an acute angle with a plane defined by an intersection between the housing and frame.

10. The controller according to claim 1, wherein the visual markers comprise:

alternating markers of contrasting colours.

11. The controller according to claim 1, wherein the visual markers form a grid comprising:

a plurality of rows of markers, wherein a colour of the markers within any one row is the same, and wherein a colour of the markers in at least one of the rows differs from a colour of the markers in another row.

12. The controller according to claim 11, wherein a colour of the markers in each row differs from a colour of markers in the other rows.

13. The controller according to claim 1, comprising;

a light source for illuminating an interior of the finger assembly.

14. The controller according to claim 13, wherein the light source is adjacent to the reflective surface.

15. The controller according to claim 1, wherein the controller is configured to:

initialize a first plurality of image points, wherein each image point of the first plurality of image points is indicative of a location of a respective mark of the visual markers within the first visual data input signal;

initialize a second plurality of image points, wherein each image point of the second plurality of image points is indicative of a location of a respective mark of the visual markers with the second visual data input signal;

determine a disparity map in dependence on the first and second plurality of image points; and determine a shape of the deformable membrane in dependence on the disparity map.

16. A manipulating apparatus comprising:

a controller according to claim 1.

* * * * *